United States Patent [19]

Macomber

[11] Patent Number: 4,832,394
[45] Date of Patent: May 23, 1989

[54] TRUCK CARGO BED COVER

[76] Inventor: Donald L. Macomber, 3314 Royal Oaks Dr., Vancouver, Wash. 98662

[21] Appl. No.: 147,195

[22] Filed: Jan. 22, 1988

[51] Int. Cl.[4] .............................................. B60P 7/02
[52] U.S. Cl. ..................................... 296/100; 16/355; 220/338
[58] Field of Search ....................... 296/100, 101, 213; 220/337, 338, 340; 16/355, 386, DIG. 29

[56] References Cited

U.S. PATENT DOCUMENTS

| | | | |
|---|---|---|---|
| 3,420,570 | 1/1969 | Kunz | 296/100 |
| 3,514,152 | 5/1970 | Hermon | 296/100 |
| 3,765,717 | 10/1973 | Garvert | 296/137 B |
| 4,261,611 | 4/1981 | Barry et al. | 296/100 |
| 4,284,303 | 8/1981 | Hather | 296/100 |
| 4,307,486 | 12/1981 | Matsumoto | 16/355 X |
| 4,531,775 | 7/1985 | Beals | 296/100 |
| 4,615,557 | 10/1986 | Robinson | 296/100 |
| 4,695,087 | 9/1987 | Hollrock | 296/14 |

FOREIGN PATENT DOCUMENTS

| | | | |
|---|---|---|---|
| 1187153 | 2/1965 | Fed. Rep. of Germany | 16/386 |
| 2411911 | 9/1975 | Fed. Rep. of Germany | 16/355 |
| 0037316 | 2/1984 | Japan | 16/355 |
| 0426955 | 4/1935 | United Kingdom | 16/386 |
| 1315200 | 4/1973 | United Kingdom | 16/355 |

Primary Examiner—Johnny D. Cherry
Assistant Examiner—John Gruber
Attorney, Agent, or Firm—Marger & Johnson

[57] ABSTRACT

This invention is directed to a truck cargo bed cover system which includes a hinge assembly for pivotally and removably connecting at least one cover panel member to a truck having a cargo bed. The subject hinge assembly comprises hinge support means attached to the truck for pivotally connecting each of the cover panel members to the truck. The cover panel member, in a closed position, covers the truck cargo bed and, in an open position, permits access to the cargo bed. Hinge connector means are joined to a first side of each cover panel member for pivotally and removably connecting and disconnecting the cover panel member, respectively, to and from the hinge support means. Each hinge connector means is therefore readily connectable to and disconnectable from the hinge support means for readily attaching and removing the cover panel member from the truck.

14 Claims, 3 Drawing Sheets

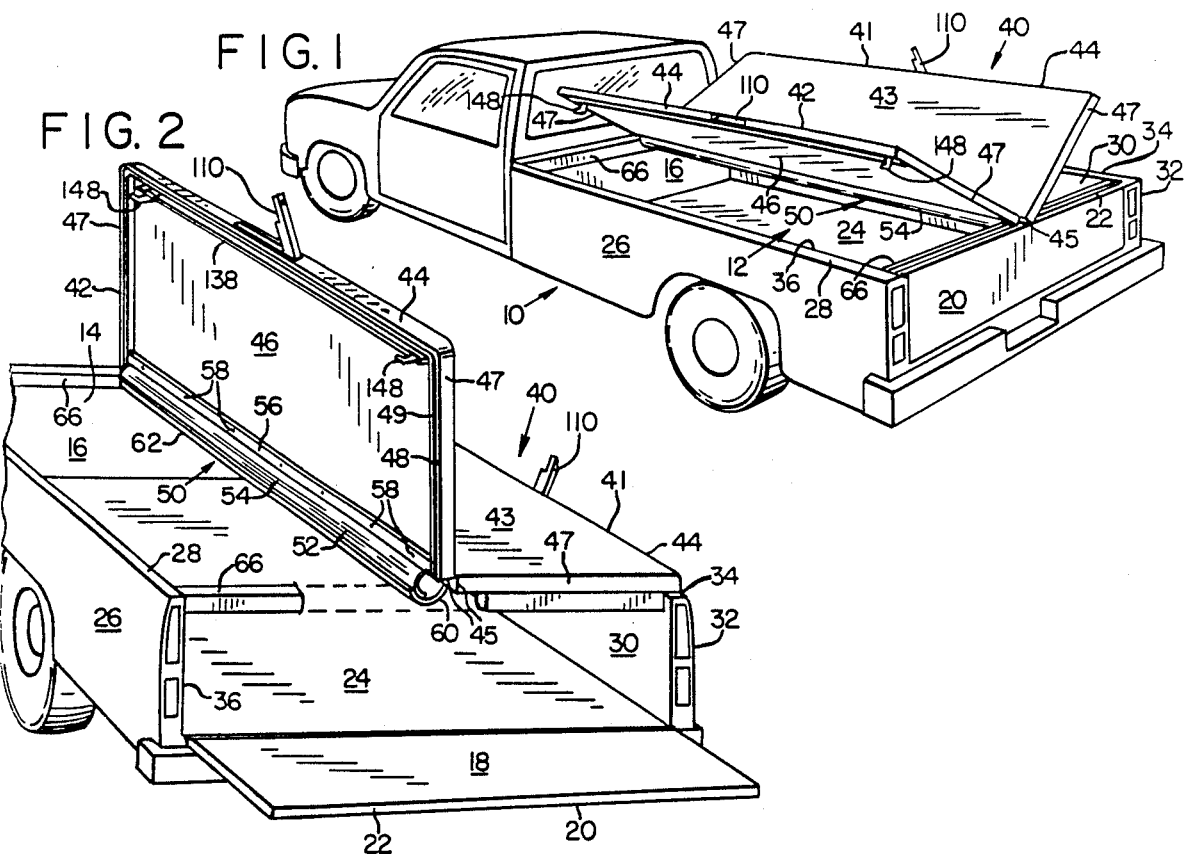
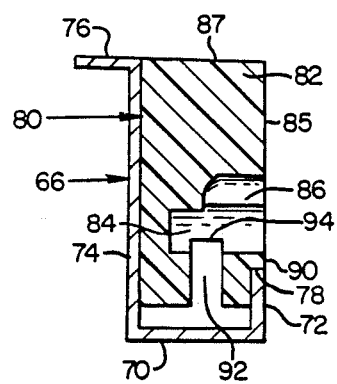
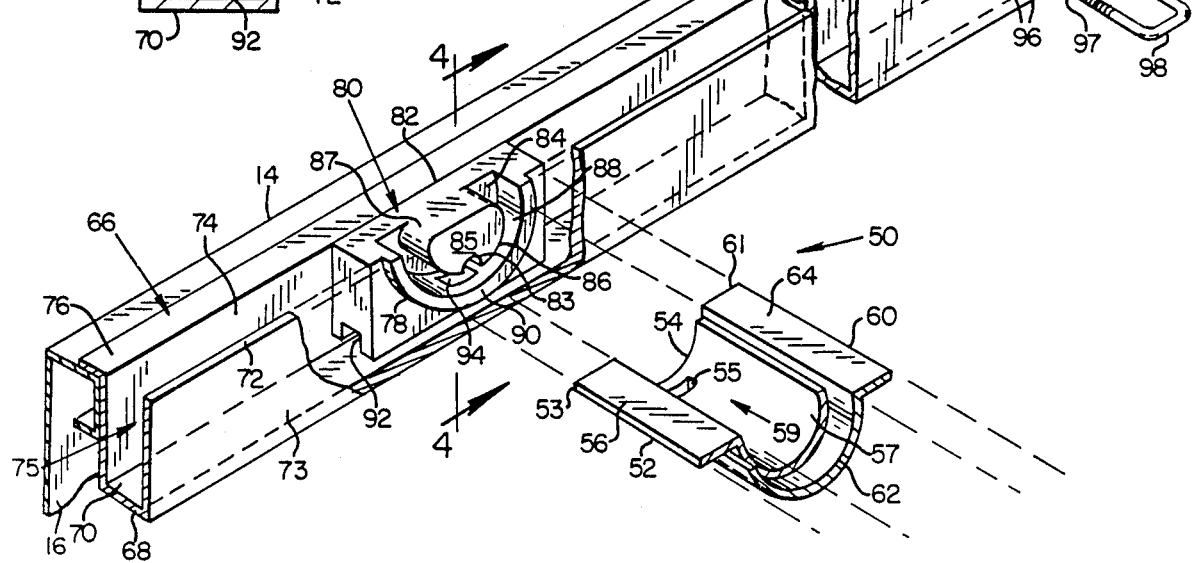

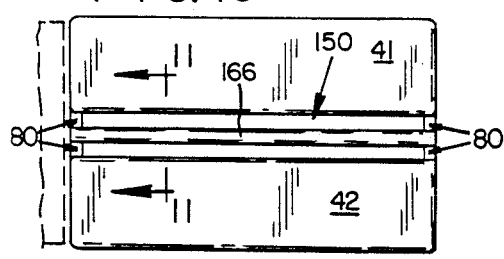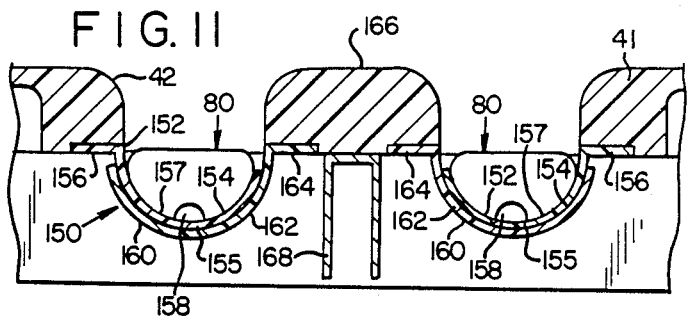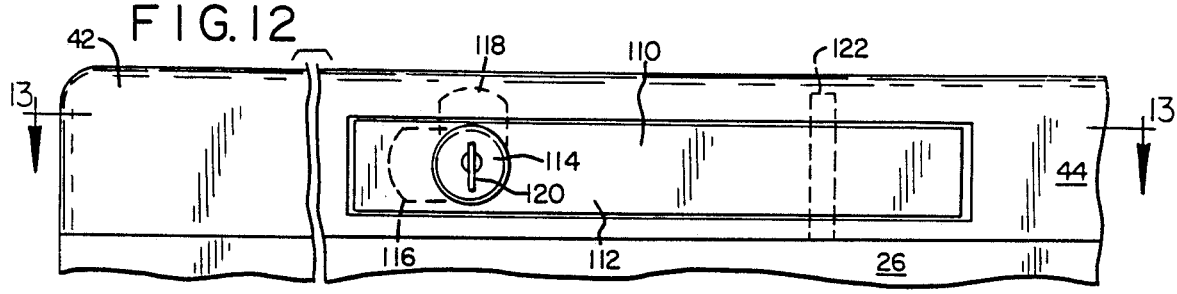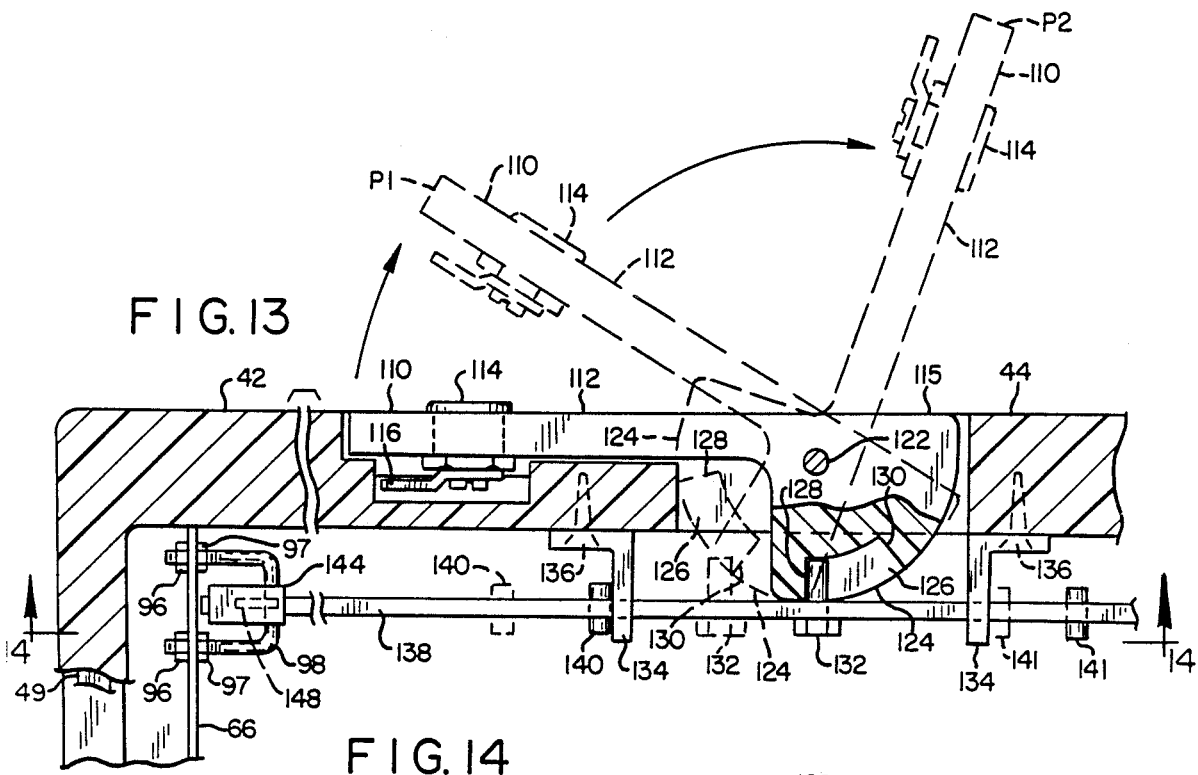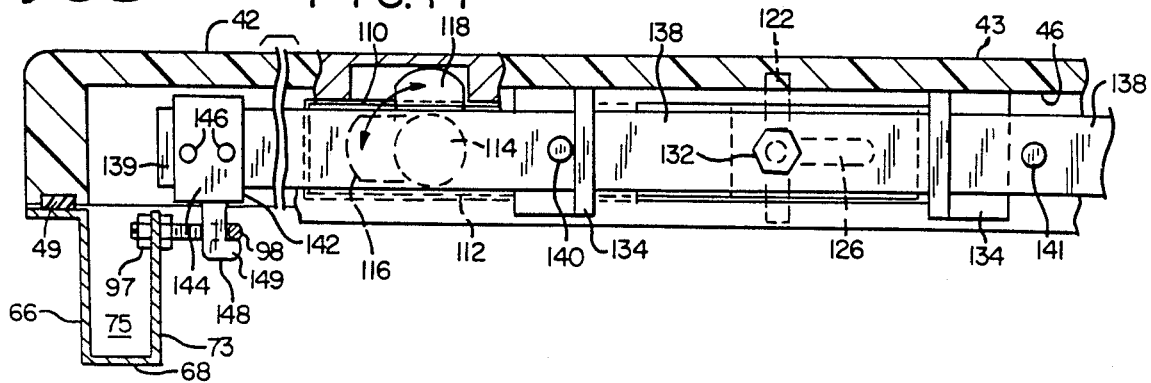

TRUCK CARGO BED COVER

BACKGROUND OF THE INVENTION

This invention relates to a truck cargo bed cover for protecting and securing goods stored therewithin, while permitting easy and effective direct access to the confines of the cargo bed for storage and removal purposes.

Various protective and security covers for truck beds, having pivotally opening cover panels, are known in the prior art. U.S. Pat. No. 4,615,557, for example, comprises a laterally-extending security cover assembly for placement over the bed of a truck. There are also a number of longitudinally-extending truck bed cover assemblies. For example, U.S. Pat. Nos. 4,284,303, 4,531,775, and 4,695,087, respectively, include a pair of longitudinally-extending, permanently hinged cover panels in which their hinges are each permanently connected on the outside longitudinally-extending edges of the cover panels for attachment onto the sidewalls of the truck bed. When the panels are moved to an open position, the interior of the truck bed is available for storing or withdrawing goods. However, in order to store or withdraw goods located within the bed, one must seek access through the back of the truck since the sides are blocked by the uprightly extending panels. In another class of truck bed cover assemblies including a plurality of longitudinally-extending, hinged cover panels, a centrally-located single hinge member permanently connects the side-by-side longitudinally-extending, inner edges of the panels, one to the other (see U.S. Pat. Nos. 3,420,570, 3,514,152, 3,765,717, and 4,261,611). In this latter type of assembly, access can be more readily made to the interior of the truck bed from either of the open sides. If, however, the truck cover assembly is to be removed from the truck body, such as depicted in FIG. 2 of U.S. Pat. No. 3,420,570, one of the panel sections is typically pivotally folded atop the other panel section in order to remove the entire folded cover from the truck itself. This procedure is at best quite cumbersome due to size and weight of the entire truck cover structure. The removal problem is even more exacerbated in truck canopies of the type set forth in U.S. Pat. No. 4,261,611, in which cover panels are attached to a central, longitudinally-extending beam member of a structural frame assembly. The frame assembly further includes, in addition to the central beam member, front and back members, and a pair of side members joined one to the other. These truck cover assemblies including frame structure are quite expensive to build. Furthermore, at least two persons are needed to remove them, in their entirety, from atop the truck bed. Another problem associated with the above truck bed cover assemblies is maintaining them in a watertight condition. The above prior art assemblies which seek to overcome this problem do so by attempting to seal the structure from the effects of rain and snow using weather stripping material and the like. In U.S. Pat. No. 4,261,611, a complex and costly system to protect against rain and splashing from road surfaces is provided including a series of external flanges located on the perimeter of the frame assembly and on the cover panels, respectively, to deflect the water away from the truck bed or to drain the water toward the exterior front or rear edges of the panels.

Therefore a need exists for a truck cargo bed protective covering which is substantially watertight, provides easy access to the contents of the cargo bed, and includes covering panels which are individually easily removed and reassembled on a truck by persons having minimum strength and mechanical skills.

SUMMARY OF THE INVENTION

This invention is directed to a truck cargo bed cover system which meets all of the above existing needs and which includes a hinge assembly for pivotally and removably connecting at least one cover panel member to a truck having a cargo bed.

More specifically, the subject hinge assembly comprises hinge support means attached to the truck for pivotally connecting each of the cover panel members to the truck. The cover panel member, in a closed position, covers the truck cargo bed and, in an open position, permits access to the cargo bed. Hinge connector means are joined to a first side of each cover panel member for pivotally and removably connecting and disconnecting the cover panel member, respectively, to and from the hinge support means. Each hinge connector means is therefore readily connectable to and disconnectable from the hinge support means for readily attaching and removing the cover panel member from the truck. A second side of the cover panel member, opposite the first side, is thus pivotally movable in either one of an upward and downward arcuate path between respective open and closed positions. In this way, access to the truck cargo bed is easy accomplished by merely raising the second side of the cover panel member.

Preferably, the hinge connector means comprises a first hinge connector member which has a substantially curved cross-sectional configuration for facilitating the easy removal and reassembly of the cover panels onto the truck. The hinge connector means can further comprise a second hinge connector means, having a complimentary configuration to the first hinge connector means, for pivotally and removably engaging and supporting the first hinge connector member. In this latter instance, the hinge connector means comprises a second hinge member, complimentary to the first hinge member, which preferably has a substantially curved cross-sectional configuration for pivotally and removably engaging and supporting the first hinge connector member. Typically, the second hinge member is attached to a second cover panel member.

Each cover panel member and hinge connector means is typically configured so that they extend in a substantially longitudinally-extending plane with respect to the longitudinal axis of the truck, while the hinge support means extends in a plane substantially normal to the longitudinal axis of the truck.

The hinge support means preferably includes hinge pivot block means for pivotally and removably connecting the hinge connector means to the truck. The hinge pivot block means thus includes means defining a support slot, including a hinge connector means support surface, for retaining and pivotally and removably connecting the hinge connector means therewithin. Generally, the hinge support means are substantially laterally-extending with respect to the truck cargo bed. Furthermore, the cross-sectional configuration of the respective support slot and the hinge support surface preferably comprise a complimentary cross-sectional configuration to the hinge connector means. More specifically, the hinge support means can comprise hinge support channel means attached to the truck, and the pivot block housing means can include a protuberance and a concave-shaped support surface, respectively, together defining means comprising an arcuate-shaped slot for receiving a hinge connector means having a complimentary arcuate-shaped cross-sectional configuration. In a desired form of this invention, a pair of the hinge support means are attached at opposite sides of the truck cargo bed for supporting the hinge connector means. Moreover, the respective ends of a pair of complimentary curved support members of respective cover panel members can be nestingly and disengagingly supported, one within the other, within a pair of the support slots. The hinge assembly can also further include reinforcing support means joined at its respective ends to the opposite sides of the truck cargo bed for pivotally and disengagingly connecting the pair of hinge support means thereto and thereby covering the truck cargo bed.

The hinge support means can include means within its confines for draining water from the exterior surface of the hinge assembly internally through the interior of the respective hinge connector means and hinge support means to the outside of the truck. In such an embodiment, the respective hinge support means and the pivot block means include drainage apertures, and the pivot block means can include internal drain duct means for internally draining water from the exterior of the hinge assembly to the outside of the truck.

A novel method is also provided for covering a truck cargo bed formed within the inner walls of a truck. This method comprises several steps. First, hinge support means are joined to opposite inner walls of the truck for connecting at least one cover panel member to the truck for covering the truck cargo bed. At least one cover panel member is then provided for covering the cargo bed. Each of these cover panel members includes hinge connector means joined to a first side of the cover panel member for connecting it to the hinge support means. Each of the hinge connector means is then pivotally and removably connected to the first side of the hinge support means, thereby pivotally and removably attaching each cover panel member to the truck. By pivotally moving a second side of each cover panel member, opposite to the first side, in a downward arcuate path to a closed position in substantial engagement with the truck sidewall, the truck cargo bed is covered. The subject method can further include the step of permitting access to the cargo bed by moving the second side of each cover panel member in an upward arcuate path to an open position without substantial engagement with the truck side wall. Moreover, a method for uncovering the cargo bed can be accomplished by pivotally moving each cover panel member until each of the hinge connector means disconnects from the hinge support means, and removing the cover panel member from the truck.

The foregoing and other objects, features and advantages of the invention will become more readily apparent from the following detailed description of a preferred embodiment which proceeds with reference to the drawings.

DETAILED DESCRIPTION OF THE DRAWINGS

FIG. 1 is a perspective view of the truck cargo bed cover system of the present invention, mounted in position atop a truck, and shown with both truck cargo cover panels in an open position.

FIG. 2 is an enlarged perspective view of the truck cargo bed cover system of FIG. 1 in position atop the truck cargo bed, and shown with one truck cargo cover panel in an open position.

FIG. 3 is an enlarged perspective, sectional view of the hinge support means of the truck cargo bed cover system of the present invention, including an enlarged, exploded sectional view of a portion of a hinge block assembly.

FIG. 4 is an enlarged, side, sectional view of the hinge block assembly of FIG. 3, taken along line 4—4.

FIG. 10 is a plan view of a second version of the truck cargo bed cover system of this invention having a central divider panel member for supporting the cover panel members.

FIG. 11 is an enlarged, sectional view of the system of FIG. 10 taken along line 11—11.

FIG. 12 is an enlarged, sectional, front elevational view of a portion of the preferred latch mechanism 110 of the present invention.

FIG. 13 is an enlarged, sectional, plan view of the latch mechanism of FIG. 12 taken along line 13—13.

FIG. 14 is an enlarged, sectional, rear elevational view of the latch mechanism of FIG. 12 taken along line 14—14.

DETAILED DESCRIPTION OF A PREFERRED EMBODIMENT

Figure 5:
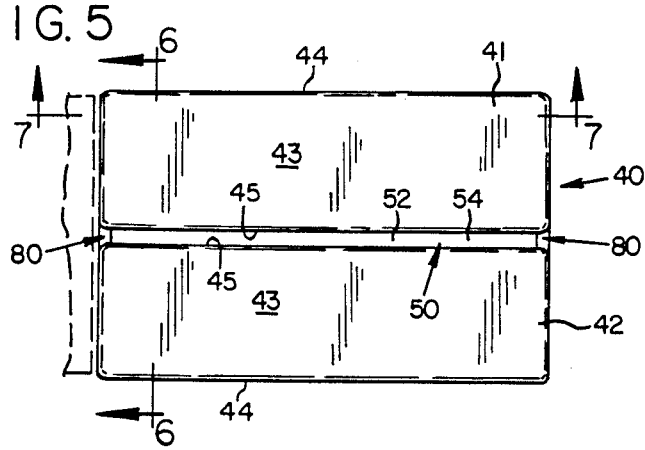
FIG. 5 is a plan view of the truck cargo bed cover system of this invention.

Referring to FIGS. 1 and 2, a truck, generally designated as 10, includes a truck cargo bed 12 formed by front wall 14, tailgate 18, sidewalls 26 and 32, and floor member 24, respectively. The front wall 14 includes inside wall 16; tailgate 20 includes inside wall 18 and top edge 22; and truck sidewalls 26 and 32 include respective top edges 28 and 34 and respective inside walls 30 and 36.

A truck bed cover system 40 is provided which, in a closed position, covers the cargo bed 12, and in the open position, permits access to the cargo bed 12. The truck bed cover system 40 comprises respective first and second cover panel members 41 and 42, each of which has a top side 43, an outside edge 44, an inside edge 45, an underside 46, and end edges 47, respectively. As depicted in FIG. 2, cover panel members 41 and 42 also include a raised peripheral underside edge 48, having peripheral seal means 49 attached thereto (see FIGS. 6 & 7) for facilitating a water-tight seal of cargo bed 12 by cover system 40. Panel members 41 and 42 extend longitudinally from front wall 14, toward the rear of the truck, onto rear tailgate 20, and laterally onto sidewalls 26 and 32. The panel members 41 and 42 have a series of holes adjacent to their inside edges 45 for attaching panel members 41 and 42 to a hereinafter described hinge assembly 50.

Referring now to FIGS. 1–8, a hinge assembly 50 is depicted for pivotally and removably connecting cover panel members 41 and 42 to the truck 10. Hinge assembly 50 is longitudinally-extending and comprises first hinge connector means 52 and second hinge connector means 60 which respectively include first and second hinge sections 54 and 62, each of which have a curved cross-sectional configuration, and are joined to first and second connector flange sections 56 and 64, respectively. First hinge connector means 52 is nestingly engaged within, and retained by, second hinge connector means 60 throughout the entire longitudinal extent of their respective nesting engagement. Thus, the hinge assembly 50 remains watertight even when panel members 41 and 42 are in a raised position. First and second hinge connector means 52 and 60 are joined to the respective inside edges of respective cover panel members 41 and 42 by attachment means 58.

When cover panel members 41 and 42 are in the closed position, the inner surface 57 of first hinge section 54 forms a discharge flow channel 59 for directing water draining from the surface of the truck bed cover system 40. This is possible since the hinge assembly forms a water-tight seal to protect the contents located within the confines of the bed 12. The water exits through drainage channel 59 passing out of means defining a drainage aperture 55.

Figure 6:
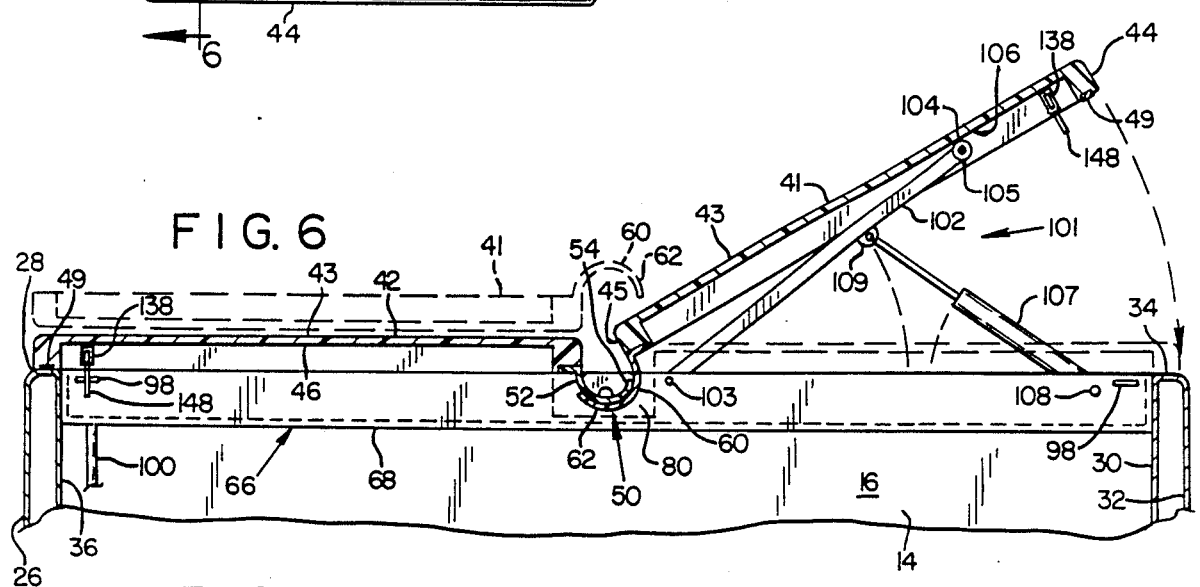
FIG. 6 is an enlarged, sectional view of the truck cargo bed cover system of FIG. 5, taken along line 6—6, with one of the truck bed cover panels in the raised position.
Figure 7:
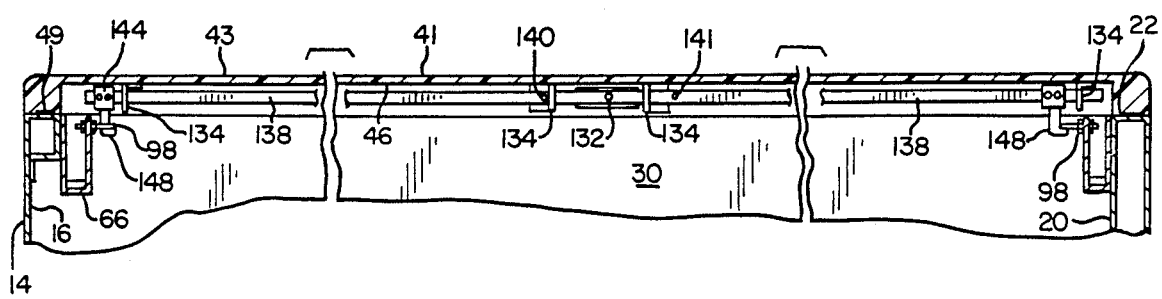
FIG. 7 is an enlarged, sectional view of the truck cargo bed cover system of FIG. 5, taken along line 7—7.
Figure 8:
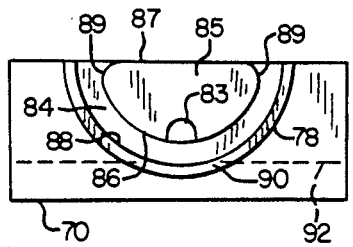
FIG. 8 is an enlarged, sectional view of the hinge block assembly of FIG. 3.
Figure 9:
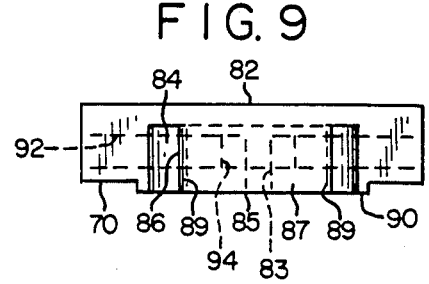
FIG. 9 is a plan view of the hinge block assembly of FIG. 8.

If, as in FIG. 6, panel cover member 41, and, in turn, hinge connector means 60, is moved to an open position, second hinge section 62 is pivotally rotated in a clockwise direction from a position of substantially complete nesting engagement with first hinge section 54, to an extended position in which only a portion of first hinge section 62 is in nesting engagement with second hinge section 54. However, even in such an extended position, a water-tight seal is formed by the hinge assembly 50.

Referring now to FIGS. 10 and 11, another form of hinge assembly 50, denoted hinge divider assembly 150, is depicted for pivotally and removably connecting a pair of cover panel members 41 and 42 to the truck 10. The hinge assembly 150 is longitudinally-extending and comprises a pair of first hinge connector means 152 and second hinge connector means 160, each of which respectively includes first and second hinge sections 154 and 162. Each of the hinge sections have a curved cross-sectional configuration. First hinge sections 154 are joined to first connector flange sections 156, which in turn are attached to panel members 41 and 42. Second hinge sections 162 are joined to second connector flange sections 164, which in turn are attached to a divider panel member 166. The divider panel member 166 is attached at its respective ends to hinge support means 66. A reinforcing support member 168 is joined to the bottom of divider panel member 166 and is also attached at its respective ends to hinge support means 66 to provide further reinforcement for the divider panel member, and in turn for the panel members 41 and 42 connected thereto. As with first and second hinge connector means 52 and 60, respective first hinge connector means 152 is nestingly engaged within, and is retained by, second hinge connector means 160 throughout the entire longitudinal extent of their respective nesting engagement. The inner surface 157 of first hinge section 154 forms a discharge flow channel 158 for directing water draining from the surface of the truck bed cover system 40. The hinge assembly also forms a water-tight seal to protect the contents located within the confines of the bed 12. The water exits through drainage channel 158 passing out of means defining a drainage aperture 155.

As best seen in FIGS. 3–8, first and second hinge connector means 52 and 60 each pivotally and removably connect the cover panel members 41 and 42 to a pair of hinge support means 66. Hinge support means 66 are respectively attached to inside walls 16 and 20. Hinge support means 66 each comprise a hinge support channel member 68, including a channel member floor section 70, and first and second channel member sidewall sections 72 and 74. Hinge support channel member 68 defines a central rectangular-shaped, cross-sectional channel 75. A channel member flange section 76 is joined to the upper end of second sidewall section 74. First sidewall section 72 includes an arcuate-shaped recess or cutout 78 which is employed to retain a hinge block assembly 80 in a fixed position within central rectangular cross-sectional channel 75.

Hinge block assembly 80 is connected to, and retains in position therewithin, the respective end portions 53 and 61 of respective first and second hinge connector means 52 and 60 for supporting truck bed cover system 40. Hinge block assembly 80 comprises a rectangular block housing 82 fixed in position within central rectangular cross-sectional channel 75 and arcuate-shaped recess 78 and includes concave-shaped slot 84 within which is connected the hinge connector ends 53 and 61, respectively. The first and second hinge connector means 52 and 60 are maintained in position within concave-shaped slot 84 by protuberance 85, which includes a concave-shaped lower section 86, and a concave-shaped support surface 88. Protuberance 85 also includes offset sections 89 for facilitating the connecting and disconnecting of first and second curved hinge sections 54 and 62 within slot 84, and a flow passageway 83 for transporting drainage water from discharge channel 59 to drainage aperture 94. An arcuate-shaped lip 90 extends outwardly from within slot 84 beyond the inner edge 73 of first side wall section 72 providing additional support for hinge assembly 50 and retaining the hinge block assembly 80 within recess 78. Means defining an internal drainage duct 92 extends through the bottom of rectangular block housing 82 so that water passing through channel 70 and drainage aperture 94 will drain internally through the interior of that duct 92 and out of a drain tube 100. Aperture 94, similar in configuration to aperture 55, extends through support surface 88, to provide an opening in block assembly 80 into internal duct 92. When hinge assembly 50 is in position within slot 84, apertures 55 and 94 are a registered disposition one with the other to form an internal continuous exit flow path for water passing through drainage channel 59.

Panel member covers 41 and 42 are maintained in a open position by support arm assembly 101 comprising a support arm 102 pivotally connected at one end, designated as 103, to hinge support means 66, and is journaled at the other end, at 104, to plastic wheel 105 which rides within track 106 located within the respective cover members. Support arm 102 is held in position by spring-loaded support arm 107 which is pivotally connected at point 108 to hinge support means 66 and is pivotally connected at 109 to support arm 102.

As specifically depicted in FIG. 12, the latch assembly 110 of this invention comprises a latch arm 112 having a front wall 113 having a latch lock 114 included therewithin. The latch lock 114 can be moved from an unlocked to a locked position (see 116 and 118 in phantom) employing latch key 120. In FIGS. 13 and 14, the latch arm 112 is pivotally connected to latch pin 122 for movement between a closed position, to an opened position as depicted in phantom in FIG. 13. The latch arm 112 comprises a latch leg section 124 having a latch slot 126 disposed therein. Latch slot 126 includes respective first and second slot end wall sections 128 and 130. A pair of hanger brackets 134 are attached to the cover 42 by screws 136. A rectangularly-shaped hanger aperture 135 is located in each of the hanger brackets 134. A bar 138 passes within hanger aperture 135 which has been sized for slidable, side-to-side movement therewithin. Attached at the respective ends 139 of bar 138 are fastening sections 142 comprising a collar section 144, which is attached to bar 138 by pins 146, and a fastening ear 148, joined to the bottom of collar section 144, including a hooked section 149. A pair of limit stops 140 and 141 attached to bar 138 are slidably movable until they engage hanger brackets 134 for limiting the extent of side-to-side movement of bar 138, and in turn the extent of side-to-side movement of fastener section 142. A finger 132 is also attached to bar 138 and projects within slot 126. As shown in FIG. 14, when the latch arm 112 is in the closed position, finger 132 engaged against first slot end wall 128. Moreover, in the closed position, hooked sections 149 of fastening ears 148 interlockingly engage latch bolts 98 and prevent cargo bed cover panel 42 from being opened thereby keeping the truck bed contents secure. As arm 112 is pivotally moved to an open position, through first phantom position "P1" to second phantom position "P2", second slot end wall 130 is engaged by finger 132 which moves bar 138 to a maximum extended "open" position with the hooked section 149 of fastening ear 148 disengaged from latch bolt 98 and limit stop 141 engaging hanger 134. In this disengaged state, panels 42 can be moved to an opened position or, the panels can be disengaged from hinge assembly 42 and removed from the truck cargo bed. The extent of movement of stops 140, 141, and finger 132, respectively, are depicted by the respective stops and finger in "solid" and in "phantom" in FIG. 14. More particularly, the extent of such movement of stops 140 corresponds to the movement of finger 132 so that they all are substantially the same.

In use, the truck bed cover system 40 hinge support means 66 are first joined to the inner sidewall surfaces 30 for connecting cover panel members 41 and 42 to the truck 10 for covering the truck cargo bed 12. This is accomplished by attaching anchor bolt 79 to the surfaces 30 at the respective front and rear portions of cargo bed 12 adjacent inside wall 16 and the tailgate 18. The hinge connector means 60 of cover panel member 42 then pivotally and removably connected to hinge block assembly 80 by engagement of second curved hinge section 62 within arcuate-shaped slot 84 and supported by hinge cradle 88 with cover panel member 42 resting on sidewalls 26 and 32, and tailgate 18, respectively. Similarly, hinge connector means 52 of cover panel member 41 is pivotally and removably connected within hinge block assembly 80 by slidable engagement of first curved hinge section 54 within second curved hinge section 62. By pivotally moving the outer peripheral edge 44 of cover panel member 41 in a downward arcuate path to a closed position, as described above, the truck cargo bed will be covered.

In order to permit access to the cargo bed outer peripheral edge 44, of cover panel members 41 and 42 are moved in an upward arcuate path to an open position as shown in FIGS. 1 and 6. Moreover, for uncovering the cargo bed 24, either or both of panel members 41 and 42 are pivotally moved over an arcuate distance of up to about 180 degrees to a position as depicted in FIG. 6, or until the panel member disconnects from the hinge support means 66. The cover panel member is then removed from the cargo bed and stored for subsequent use.

The cover panel members 41 and 42, the divider panel member 166, and the hinge block assembly 80, are preferable fabricated of a impact resistant polymeric material such as nylon and the like. The hinge support channel member 68 is preferably fabricated of a metallic material such as steel and the like.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim the following:

1. A hinge assembly for pivotally and removably connecting at least one cover panel member to a truck having a cargo bed, which comprises:

hinge support means attached to the front and back of said truck cargo bed, respectively, for pivotally connecting said cover panel member to said truck, said cover panel member in a closed position covering said truck cargo bed and, in an open position, permitting access to the cargo bed; and hinge connector means pivotally connected to said hinge support means including pivot housing means for pivotally and removably connecting said hinge connector means to said truck, and further including means defining a support slot having a hinge connector means support surface for retaining and pivotally and removably connecting said hinge connector means therewithin, said hinge connector means joined to a first side of each said cover panel member for pivotally and removably connecting and disconnecting said cover panel member, respectively, to and from said hinge support means, a second side of said cover panel member, opposite said first side, being pivotally movable in either one of an upward and downward arcuate path between respective open and closed positions.

2. The hinge assembly of claim 1, wherein said hinge connector means comprises a first hinge connector member having a substantially curved cross-sectional configuration.

3. The hinge assembly of claim 1, wherein said hinge connector means further comprises a second hinge connector means, having a complimentary configuration to a first hinge connector means, for pivotally and removably engaging and supporting said first hinge connector member.

4. The hinge assembly of claim 2, wherein said hinge connector means comprises a second hinge member, complimentary to said first hinge member, and having a substantially curved cross-sectional configuration for pivotally and removably engaging and supporting said first hinge connector member.

5. The hinge assembly of claim 4, wherein said second hinge member is attached to a second cover panel member.

6. The hinge assembly of claim 1, wherein said hinge connector means are substantially longitudinally-extending with respect to said truck cargo bed.

7. The hinge assembly of claim 1, wherein said hinge support means are substantially laterally-extending with respect to said truck cargo bed.

8. The hinge assembly of claim 1, wherein a cross-sectional configuration, of said respective support slot and said hinge support surface, taken perpendicular to the longitudinal axis of said hinge assembly comprises a complimentary cross-sectional configuration to said hinge connector means.

9. The hinge assembly of claim 8, wherein said hinge support means comprises hinge support channel means attached to said truck, and said pivot housing means including a protuberance and a concave-shaped support surface, respectively, together defining means comprising said slot, said slot having an arcuate shape for receiving a hinge connector means having a complimentary arcuate-shaped cross-sectional configuration.

10. The hinge assembly of claim 1, wherein a pair of said hinge support means are attached at opposite sides of said truck cargo bed for supporting said hinge connector means.

11. The hinge assembly of claim 1, wherein said hinge support means includes means within its confines for draining water from the exterior surface of said hinge assembly internally through the interior of said respective hinge connector means and hinge support means to the outside of the truck.

12. The hinge assembly of claim 1, wherein respective ends of a pair of complimentary curved hinge members of respective cover panel member are nestingly and disengagingly supported, one within the other, within a pair of said support slots.

13. The hinge assembly of claim 1, wherein said respective hinge support means and said pivot block means include drainage apertures, and said pivot block means includes internal drain duct means for internally draining water from the exterior of said hinge assembly to the outside of the truck.

14. A truck cargo bed cover system, which comprises:
a pair of cover panel members for covering a cargo bed of a truck, said cover panel members extending in a substantially longitudinally-extending plane with respect to the longitudinal axis of said truck;
a pair of hinge support means attached to the front an back of said truck cargo bed for pivotally connecting each said cover panel member to said truck, said hinge support means extending in a plane substantially normal to the longitudinal axis of said truck; and
a pair of hinge connector means, extending in a substantially longitudinally-extending plane with respect to the longitudinal axis of said truck, for pivotally and removably connecting each said cover panel member to said hinge support means, including means for pivotally and removably connecting said hinge connection means to said truck, and further including means defining support slot means having a hinge connector means support surface for retaining and pivotally and removably connecting said hinge connection means therewithin, each said hinge connector means comprising a hinge connector member having a curved hinge section joined at one end to a first side of each said cover panel member, a second side of each said cover panel member opposite each said first side being pivotally movable in either one of an upward and downward arcuate path between respective open and closed positions.

* * * * *